(12) United States Patent
Hamel et al.

(10) Patent No.: US 11,318,998 B2
(45) Date of Patent: May 3, 2022

(54) LOCKING MECHANISM FOR A ROTATING MUDGUARD ASSEMBLY

(71) Applicant: AGCO International GmbH, Neuhausen (CH)

(72) Inventors: Valentin Hamel, Beauvais (FR); Philippe Boittin, Laboissiere en Thell (FR); Johnny Dhordain, Rainvillers (FR); Francois Quoniam, Beauvais (FR)

(73) Assignee: AGCO International GmbH, Neuhausen (CH)

( * ) Notice: Subject to any disclaimer, the term of this patent is extended or adjusted under 35 U.S.C. 154(b) by 218 days.

(21) Appl. No.: 16/623,110

(22) PCT Filed: Jun. 12, 2018

(86) PCT No.: PCT/EP2018/065495
§ 371 (c)(1),
(2) Date: Dec. 16, 2019

(87) PCT Pub. No.: WO2018/229048
PCT Pub. Date: Dec. 20, 2018

(65) Prior Publication Data
US 2020/0122782 A1    Apr. 23, 2020

(30) Foreign Application Priority Data
Jun. 14, 2017    (EP) .................................... 17290077

(51) Int. Cl.
*B62D 25/18*    (2006.01)
*B62D 25/16*    (2006.01)

(52) U.S. Cl.
CPC ......... *B62D 25/182* (2013.01); *B62D 25/163* (2013.01)

(58) Field of Classification Search
CPC .. B62D 25/182; B62D 25/186; B62D 25/184; B62D 25/163; B62D 25/168; E05D 11/1057; E05D 11/1085
See application file for complete search history.

(56) References Cited

U.S. PATENT DOCUMENTS

| 521,429 | A | * | 6/1894 | Bessonette | .......... | E05D 11/1085 |
| | | | | | | 16/322 |
| 2,725,251 | A | | 11/1955 | Wagner | | |

(Continued)

FOREIGN PATENT DOCUMENTS

| CN | 207453715 U | * | 6/2018 |
| DE | 3401631 A1 | | 7/1985 |

(Continued)

OTHER PUBLICATIONS

European Patent Office, International Search Report prepared for International Application No. PCT/EP2018/065495, dated Sep. 12, 2018.

(Continued)

*Primary Examiner* — Steve Clemmons (57) ABSTRACT

A rotating mudguard assembly having fixed and rotating parts includes a locking mechanism to limit the relative movement between the fixed and rotating parts of the assembly. The locking mechanism has a locking pin which can selectively engage with a locking plate, the pin and the plate on respective parts of the rotating mudguard assembly. The locking mechanism may be an integral part of the assembly, or the locking mechanism may be a kit of parts for installation on or retrofitting to an assembly.

10 Claims, 8 Drawing Sheets

(56) References Cited

U.S. PATENT DOCUMENTS

| | | | |
|---|---|---|---|
| 4,335,862 A | 6/1982 | Sherman | |
| 5,074,573 A * | 12/1991 | Dick | B62D 25/186 280/157 |
| 5,984,037 A * | 11/1999 | Duhem | B62D 25/184 180/69.2 |
| 6,053,517 A * | 4/2000 | Lodi | B62D 25/186 172/509 |
| 6,502,841 B1 * | 1/2003 | Skelcher | B62D 25/186 280/156 |
| 7,481,442 B2 * | 1/2009 | Lodi | B62D 25/168 280/154 |
| 8,388,003 B2 * | 3/2013 | Wellman | B62D 25/186 280/157 |
| 8,882,121 B2 * | 11/2014 | Ducroquet | B62D 25/18 280/157 |
| 9,193,392 B2 * | 11/2015 | Lodi | B62D 25/163 |
| 9,637,176 B2 * | 5/2017 | Heino | B62D 25/186 |
| 2006/0108765 A1 * | 5/2006 | Teich | B62D 25/186 280/157 |
| 2012/0080908 A1 | 4/2012 | Wellman | |
| 2013/0154228 A1 | 6/2013 | Ducroquet | |

FOREIGN PATENT DOCUMENTS

| | | | |
|---|---|---|---|
| DE | 3607000 A * | 12/1987 | |
| EP | 1 043 217 A1 | 10/2000 | |
| EP | 3045380 A1 | 7/2016 | |
| FR | 2893658 B1 * | 12/2007 | E05D 11/1057 |
| FR | 2996580 A1 * | 4/2014 | E05D 11/1057 |
| WO | WO-2019008885 A1 * | 1/2019 | B62D 25/186 |

OTHER PUBLICATIONS

UK Intellectual Property Office, Search Report Prepared for UK Priority Application No. GB1711 I 17.0, dated Oct. 20, 2017.

* cited by examiner

LOCKING MECHANISM FOR A ROTATING MUDGUARD ASSEMBLY

CROSS-REFERENCE TO RELATED APPLICATIONS

This application is a national phase entry under 35 U.S.C. § 371 of International Patent Application PCT/EP2018/065495, filed Jun. 12, 2018, designating the United States of America and published in English as International Patent Publication WO 2018/229048 A1 on Dec. 12, 2018, which claims the benefit of the filing date of European Patent Application 1729077.1, filed Jun. 14, 2017, the entire disclosure of each of which is incorporated herein by reference.

FIELD

The present invention relates to a locking mechanism for a rotating mudguard assembly for use on an agricultural vehicle, and a rotating mudguard assembly having such a locking mechanism.

BACKGROUND

In agricultural vehicles such as agricultural tractors, it is known to provide pivoting or rotating mudguard assemblies to allow mudguards to follow the rotation of the adjacent wheels, in particular tractor front wheels. The rotating mudguard assemblies follow the rotation of the wheels within an allowable steering angle, but will prevent rotation of the mudguards if the wheels exceed the allowable steering angle, such that the mudguards are prevented from striking the tractor bodywork for relatively large steering angles.

Due to the position of such mudguards adjacent the forward engine compartment of the vehicle, there can be a regular need to access those parts of the vehicle inboard of the mudguard assembly. In such cases, it can be useful to position the pivoting mudguard assembly in a service configuration, such that an operator has relatively unimpeded access to the vehicle engine compartment or other inboard components. However, the provision of a safe and secure service configuration for a pivoting mudguard assembly, which can be easily activated by an operator, is a challenge for current mudguard assemblies.

A known mudguard assembly produced by Lodi S.p.A. is shown in U.S. Pat. No. 7,481,442. For such a system, the retention of the pivoting assembly in a service position can require the use of additional tools by an operator. In particular, an Allen wrench tool is attached to a bolt or screw of the assembly, which can be used as a stop to prevent movement of the assembly. Such a system is not a particularly safe or secure solution, and may result in injury to an operator in the event of accidental dislodgement of the Allen wrench from the assembly.

In the mudguard assembly produced by Motoseal Components Oy, and as shown in European Patent Application Publication EP 3045380 A1, the assembly is provided with recesses into which service position balls may be received, in order to temporarily retain the mudguard assembly in a service position. While such a solution does not require any additional tools for actuation of the service position, the assembly may be relatively easily knocked out of the service position, e.g. by an operator bumping into the mudguard with sufficient force to dislodge the service position balls from the recesses. In addition, the exact service position allowed by the assembly is limited by the location of the machined recesses within the assembly—thereby limiting the usefulness of such a solution for different vehicle or wheel dimensions.

As a result, it is an object of the invention to provide a rotating mudguard assembly for an agricultural vehicle which can safely and securely be placed in a service configuration, without requiring additional tooling.

BRIEF SUMMARY

Accordingly, there is provided a rotating mudguard assembly for an agricultural vehicle, preferably an agricultural tractor, the rotating mudguard assembly comprising: a fixed part for mounting to the agricultural vehicle; and a rotating part for receiving a mudguard, the rotating part moveable on the fixed part to allow the mudguard to be pivoted relative to the agricultural vehicle, wherein the rotating mudguard assembly further comprises a locking mechanism, the locking mechanism comprising: a locking plate provided on one of said fixed or rotating parts of the assembly, and a locking pin system provided on the other of said fixed or rotating parts, the locking pin system having a moveable locking pin to selectively engage with the locking plate, wherein movement of the rotating part relative to the fixed part can be limited by engagement of the locking pin with the locking plate.

Through the use of the additional locking mechanism, the movement of the rotating part of the mudguard assembly can be selectively limited. This can allow an operator to easily position and hold the rotating part in a service position, with no danger of being struck by the rotating part during a service operation. As the locking mechanism is provided as part of the mudguard assembly, accordingly no additional tools are needed to hold the rotating part in a service position.

It will be understood that the fixed part of the rotating mudguard assembly is preferably mounted directly to the wheel hub or wheel carrier of the vehicle. The mudguard can be directly mounted to the rotating part, so that the mudguard is rotatable relative to the remainder of the vehicle. This allows the mudguard to pivot to follow rotation of the vehicle wheels, within an allowable steering angle of the wheels, as is known from the prior art.

In one aspect, the locking mechanism can be provided as an integral part of a rotating mudguard assembly, e.g. as integrally formed with the fixed and rotating parts.

Alternatively, the locking mechanism can be provided as a system to be attached with the fixed and rotating parts of rotating mudguard assembly, e.g. as a retrofitted solution.

Preferably, the locking pin is moveable between an extended position and a retracted position, wherein the locking pin can engage with the locking plate when in the extended position.

Preferably, the locking pin is biased to a retracted position.

Preferably, the locking pin system comprises a spring to bias the locking pin towards the retracted position.

By biasing the locking pin to a retracted position, the locking pin is prevented from engaging with the locking plate during normal operation, and the locking mechanism can be selectively actuated when required.

Preferably, the locking pin system comprises a lever to control movement of the locking pin between the extended and retracted positions.

The use of a lever to control actuation of the locking mechanism provides a system which can be easily and safely operated by a user.

Preferably, the locking pin system comprises a housing block having a through-going aperture, a carriage member received in the aperture, the lever pivotally coupled with a first end of the carriage member, the locking pin provided in the channel at an opposed second end of the carriage member.

Preferably, the locking pin system comprises an auxiliary spring located in the housing block to bias the carriage member towards the second end, away from the lever.

Preferably, the locking mechanism is configured to selectively retain the rotating part of the mudguard assembly in a service position, where the rotating part is held at a service angle relative to the fixed part.

Preferably, the position of the locking plate relative to that part of the mudguard assembly it is provided on is adjustable, to allow for adjustment of the allowable service angle where the rotating part is held relative to the fixed part.

By appropriate adjustment of the locking plate relative to that part of the mudguard assembly to which it is mounted, it is possible to adjust the angle at which the locking plate will engage with an extended locking pin.

Preferably, the locking pin comprises a lip at a free end of the locking pin, the lip adapted to engage with an opposed face of the locking plate facing away from the locking pin.

There is further provided an agricultural vehicle, preferably an agricultural tractor, comprising at least one rotating mudguard assembly as described above.

In a further aspect, there is provided a locking mechanism for installation on a rotating mudguard assembly, the locking mechanism comprising:

a locking plate for attachment to one of a fixed or rotating part of a rotating mudguard assembly a locking pin system for attachment to the other of said fixed or rotating parts, the locking pin system having a moveable locking pin to selectively engage with the locking plate, wherein movement of the rotating part relative to the fixed part can be limited by engagement of the locking pin with the locking plate.

The locking mechanism can be provided as a kit of parts for installation on or retrofitting to an existing rotating mudguard assembly, to provide an improved rotating mudguard assembly having a lockable service position.

BRIEF DESCRIPTION OF THE DRAWINGS

Embodiments of the invention will now be described, by way of example only, with reference to the accompanying drawings, in which.

DETAILED DESCRIPTION

The drawings are provided by way of reference only, and will be acknowledged as not to scale.

Figure 1:
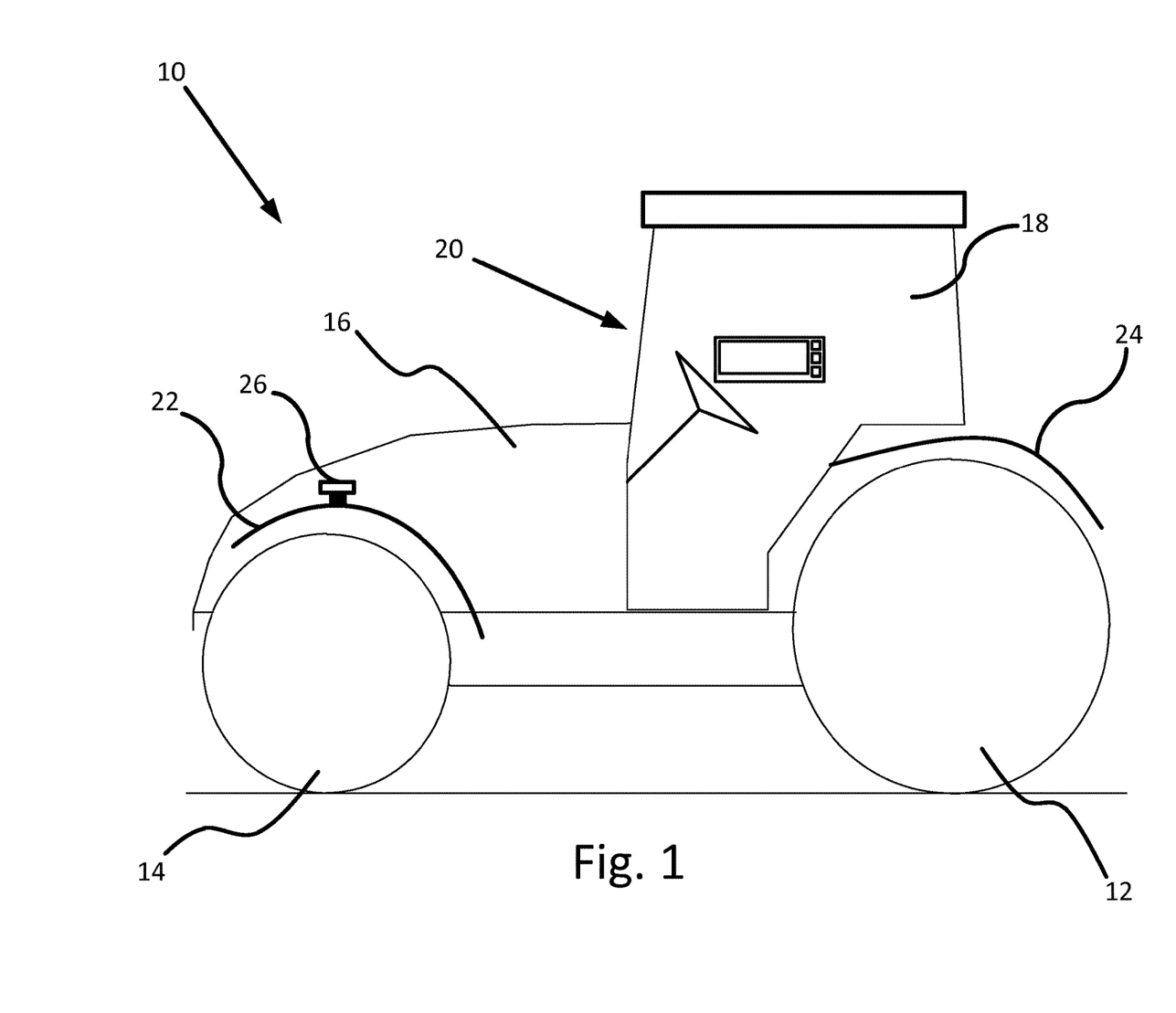
FIG. 1 is an overview of an agricultural tractor having a pivoting mudguard assembly according to the invention.

With reference to FIG. 1, an overview of an agricultural vehicle according to the invention in the form of an agricultural tractor is indicated at 10. The tractor 10 comprises rear wheels 12 and front wheels 14, a forward engine compartment 16 and a cab section 18. The cab section 18 is provided with a driver station indicated generally at 20, which allows an operator to drive and control the tractor 10.

Front wheel fenders or mudguards 22 are provided to cover a portion of the front wheels 14, with rear wheel fenders or mudguard 24 provided adjacent the rear wheels 12. The front wheel mudguard 22 is mounted on a mudguard system indicated at 26.

Figure 2:
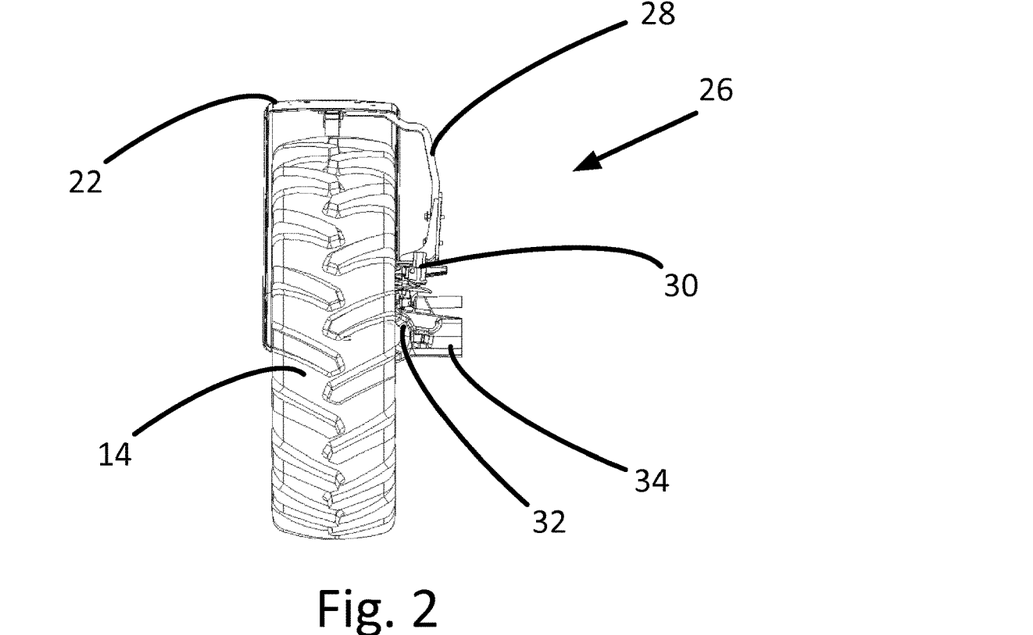
FIG. 2 is a front view of a front wheel having a pivoting mudguard assembly according to the invention.
Figure 3:
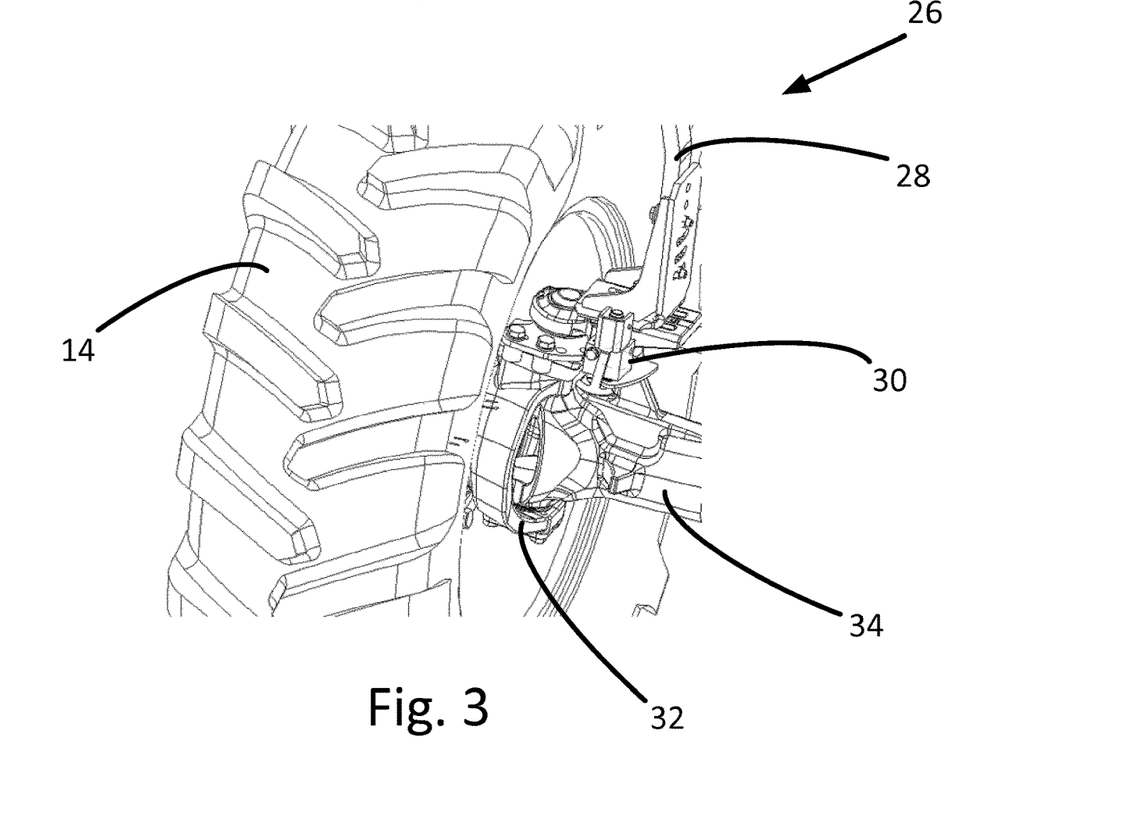
FIG. 3 is an enlarged view of the pivoting mudguard assembly of FIG. 2.

The positioning of the mudguard system 26 on the tractor 10 is illustrated in more detail in FIGS. 2 and 3. The mudguard system 26 comprises a mudguard bracket 28 to which the mudguard 22 is mounted. The mudguard bracket 28 is mounted to a rotating mudguard assembly 30, which is in turn mounted to the wheel carrier 32 of the front wheel 14. The wheel carrier 32 is supported by the axle 34, and which controls the steering of the front wheel 14. The rotating mudguard assembly 30 allows the mudguard 22 to follow the rotation of the wheel 14 as the wheel 14 is rotated within an allowable steering angle, and prevents further rotation of the mudguard 22 once the wheel 14 exceeds the allowable steering angle to prevent the mudguard 22 striking the adjacent body of the tractor 10, as is known from the prior art.

Figure 4:
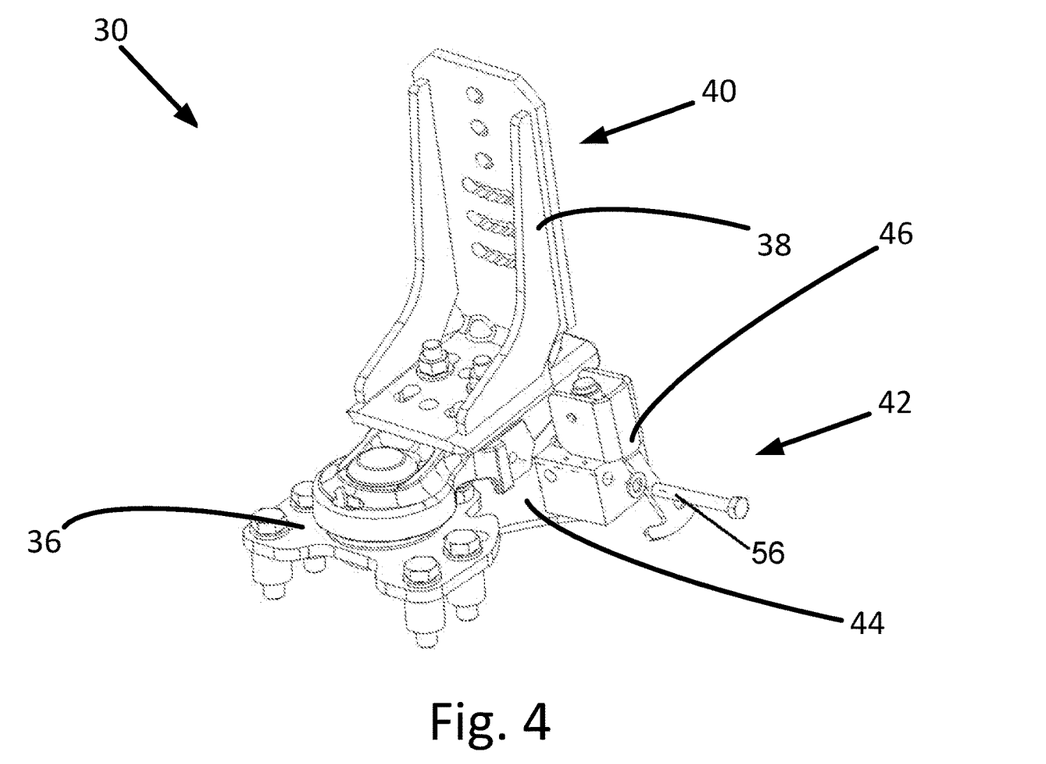
FIG. 4 is a perspective view of a pivoting mudguard assembly having a locking mechanism according to the invention.

The rotating mudguard assembly 30 according to the invention is shown in more detail in FIG. 4. The rotating mudguard assembly 30 comprises a fixed part 36 which is for mounting to the wheel carrier 32 and a rotating part 38 which is rotatable or pivotable relative to the fixed part 36. The rotating part 38 comprises suitable attachment elements 40, e.g. bolt holes, for the attachment of the mudguard bracket 28 to the rotating part 38.

The rotating mudguard assembly 30 further comprises a locking mechanism indicated generally at 42. The locking mechanism 42 comprises a locking plate 44 attached to the fixed part 36 (as can be seen in more detail in FIG. 5), and a locking pin system 46 attached to the rotating part 38. The locking mechanism 42 is actuatable, to allow for selective limitation of the rotation of the rotating part 38 relative to the fixed part 36, in particular to retain the rotating part 38 in a defined service position, where the rotating part 38 is rotated relative to the fixed part 36. Actuation of the locking mechanism 42 may be easily done by an operator, when access is desired to the areas of the tractor 10 inboard of the mudguard 22.

Figure 5:
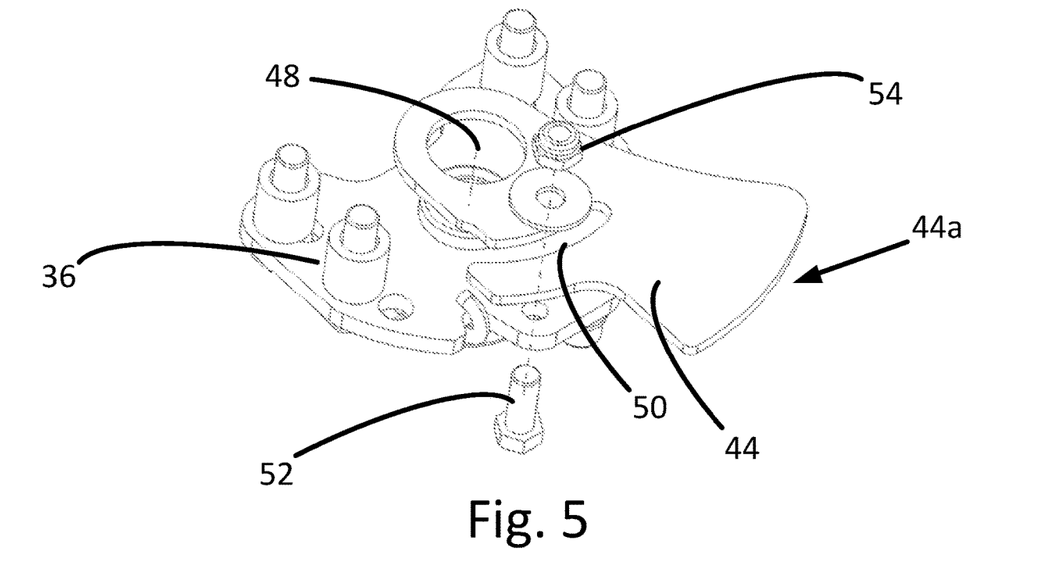
FIG. 5 is an underside view of the assembly of FIG. 4.

With reference to FIG. 5, the locking plate 44 is mounted to the underside of the fixed part 36. The locking plate 44 comprises an aperture 48 which can be arranged about the pivot axle (not shown) of the assembly 30. The locking plate 44 comprises a free end 44a which projects beyond the edge of the fixed part 36. The plate 42 further comprises a channel 50 defined in the plate 44, wherein the channel 50 receives a bolt 52 or similar with can be secured to the fixed part 36 of the assembly 30 using nut 54. The position of the locking plate 44 relative to the fixed part 36 can be adjusted by rotation of the plate 44 about the pivot axle of the assembly 30, wherein the plate 44 can be secured in place through use of the bolt 52 and nut 54 within the channel 50. Similarly, the locking pin system 46 is secured to the rotating part 38 using a bolt 56 or similar attachment element.

It will be understood that in an alternative embodiment of the invention, the locking plate 44 may attached to the rotating part 38 and a locking pin system 46 may be attached to the fixed part 36. In a further alternative aspect, it will be understood that one or both of the components of the locking mechanism 42 may be formed integrally with the fixed and rotating parts 36, 38 of the rotating mudguard assembly 30.

The operation of the locking mechanism 42 is illustrated in more detail in FIGS. 6-10, where FIGS. 6-8 and 10 provide a cross-sectional view of the locking pin system 46. The locking pin system 46 comprises a housing block 58 which is attached to the rotating part 38 of the assembly 30 using bolt 56. The housing block 58 comprises a through-going aperture 60 which receives a carriage member 62.

Figure 6:
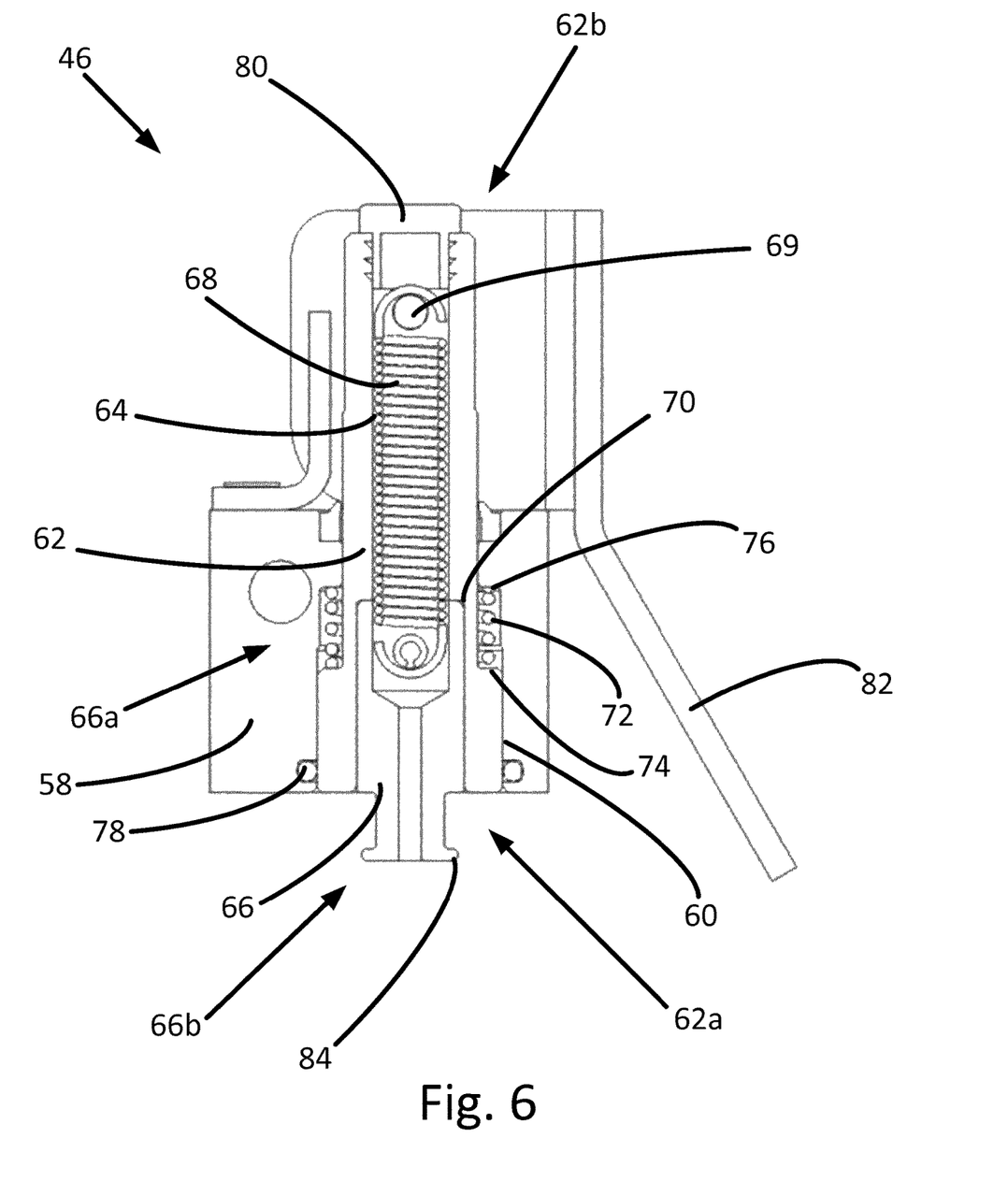
FIG. 6 is a cross-sectional view of a part of the locking mechanism of the assembly of FIG. 4, when in a retracted position.

The carriage member 62 is formed as a tubular element, having an internal passage 64. A locking pin 66 is received within the internal passage 64 at a first end 62a of the carriage member 62. A first spring 68 is coupled to a first end 66a of the locking pin 66, the first spring 68 secured at an opposed second end 62b of the carriage member 62 via a member 69 provided within the internal passage 64 towards the second end 62b of the carriage member 62. The first spring 68 acts to bias the locking pin 66 towards the second end 62b of the carriage member 62. The locking pin 66 bears against an internal shoulder 70 provided within the internal passage 64, such that the pin 66 is prevented from being fully retracted within the carriage member 62.

A sealing ring 78 is provided in the through-going aperture 60 of the housing block 58 about the carriage member 62. In addition, a sealing cap 80 is provided at the second end 62b of the internal passage 64 of the carriage member 62.

The locking pin 66 is provided with a lip or engaging projection 84 at the second end 66b of the locking pin 66.

The carriage member 62 is biased in a downwards direction from the housing block 58 using auxiliary spring 72, positioned between a shoulder 74 of the carriage member 62 and a bearing surface 76 of the through-going aperture 60. The locking pin system 46 further comprises a lever 82 which is coupled with the carriage member 62 via the member 69.

Figure 7:
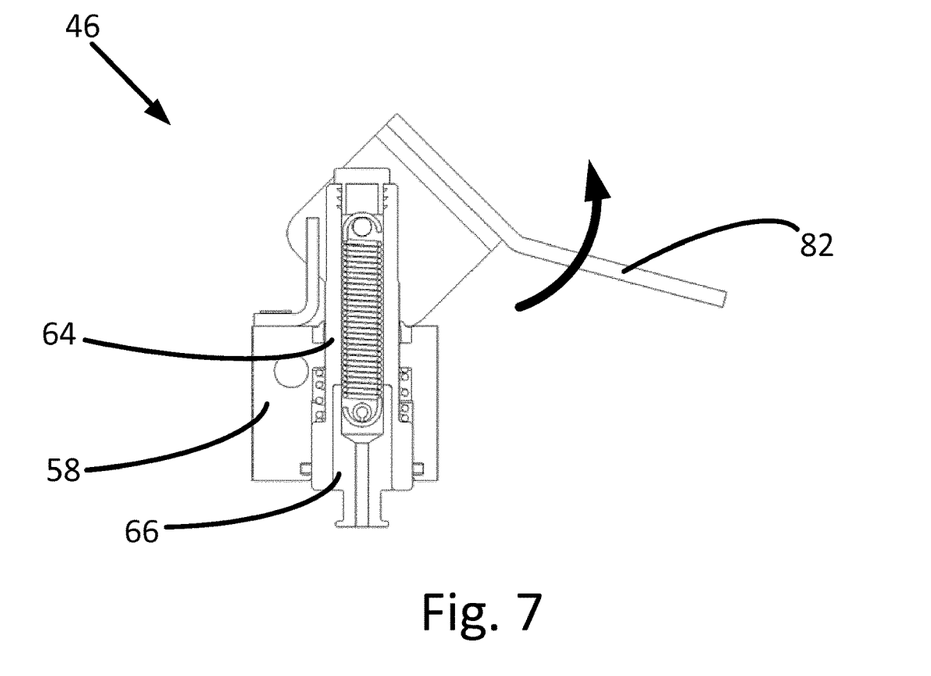
FIG. 7 is a cross-sectional view of the locking mechanism of FIG. 6 when in a transitional position.
Figure 8:
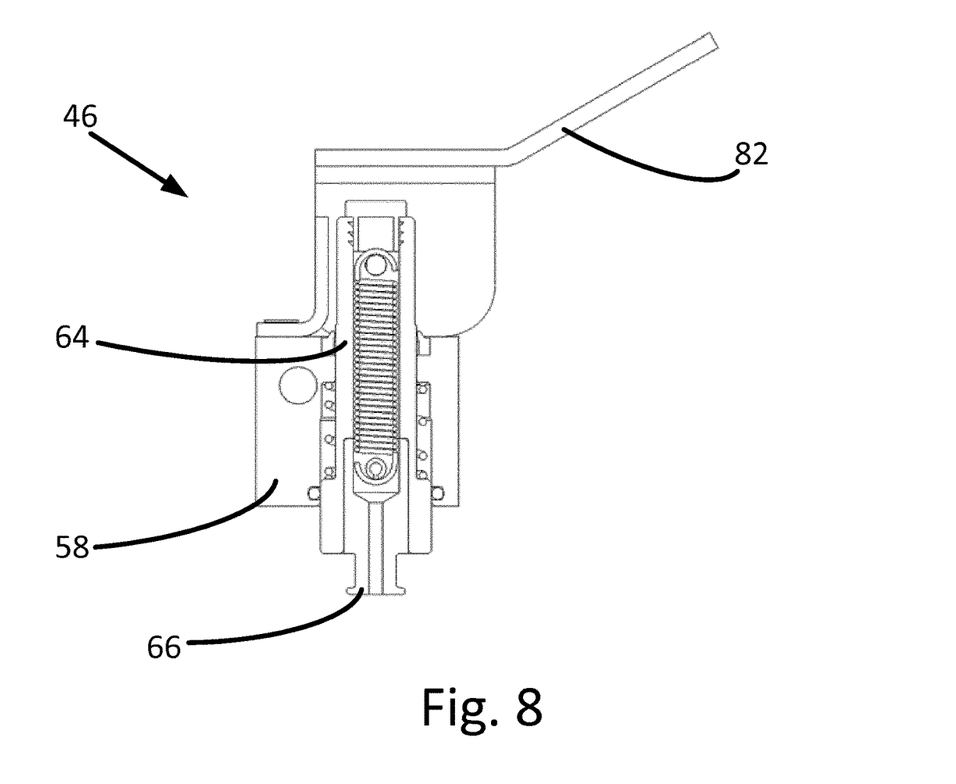
FIG. 8 is a cross-sectional view of the locking mechanism of FIG. 6 when in an extended position.

Adjustment of the lever 82 results in corresponding adjustment of the carriage member 62 within the internal passage 64. Accordingly, the adjustment of the lever 82 acts to move the locking pin 66. In FIG. 6, the lever 82 is in a normal operational position, wherein the carriage member 62 and locking pin 66 are in a retracted position relative to the housing block 58. Through appropriate raising of the lever 82, as shown in FIG. 7, the carriage member 62 and the contained locking pin 66 are advanced in a downwards direction until, as is shown in FIG. 8, the lever 82 is fully raised, and the carriage member 62 and the contained locking pin 66 are lowered to an extended position.

Figure 9:
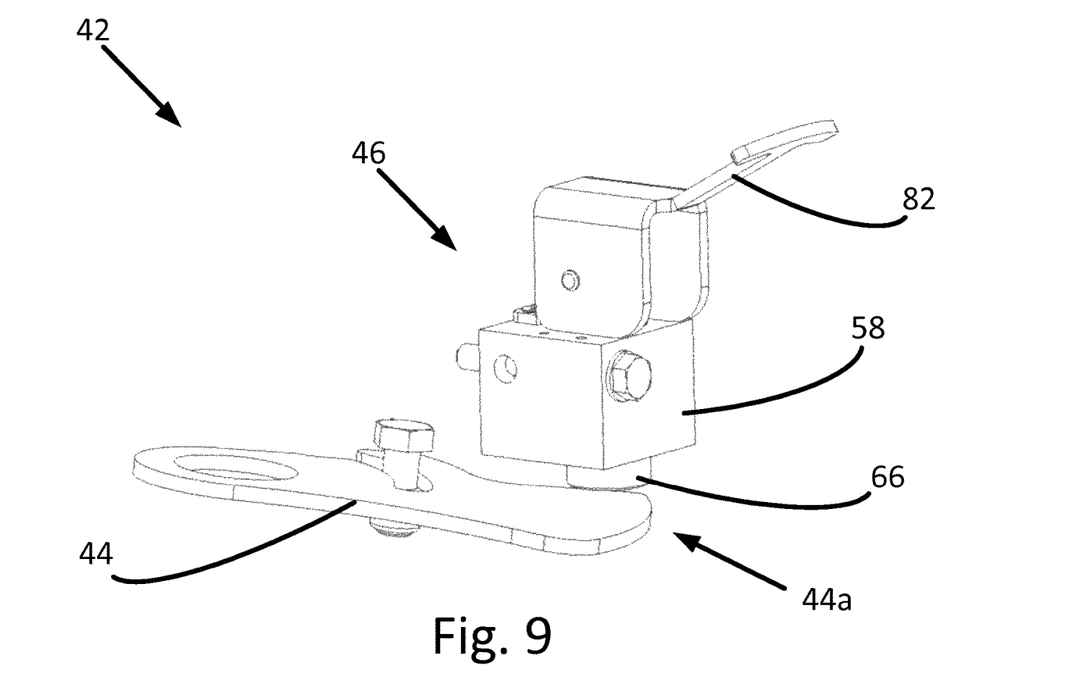
FIG. 9 is a perspective view of the locking mechanism of FIG. 8, when in an extended position.

With reference to the perspective view of the locking mechanism 42 as shown in FIG. 9, when the lever 82 is fully raised and the locking pin 66 is in the extended or advanced position, the lip 84 at the second end 66b of the locking pin 66 can be brought into engagement with the free end 44a of the locking plate 44. Accordingly, by actuation of the lever 82, the relative movement between the fixed and rotating parts 36,38 of the rotating mudguard assembly 30 can be limited by the engagement of the locking pin 66 mounted to the rotating part 38 with the locking plate 44 mounted to the fixed part 36.

In particular, when combined with appropriate actuation of the lever 82, the mudguard 22 can be moved to a service position and securely held in place by the engagement of the locking pin 66 and locking plate 44. The advanced locking pin 66 prevents the movement of the locking plate 44 by bearing against the free end 44a of the plate 44. In addition, the lip 84 engages with an opposed face of the locking plate 44 facing away from the locking pin 66, such that the pin 66 is securely held in place against the plate 44.

Figure 11:
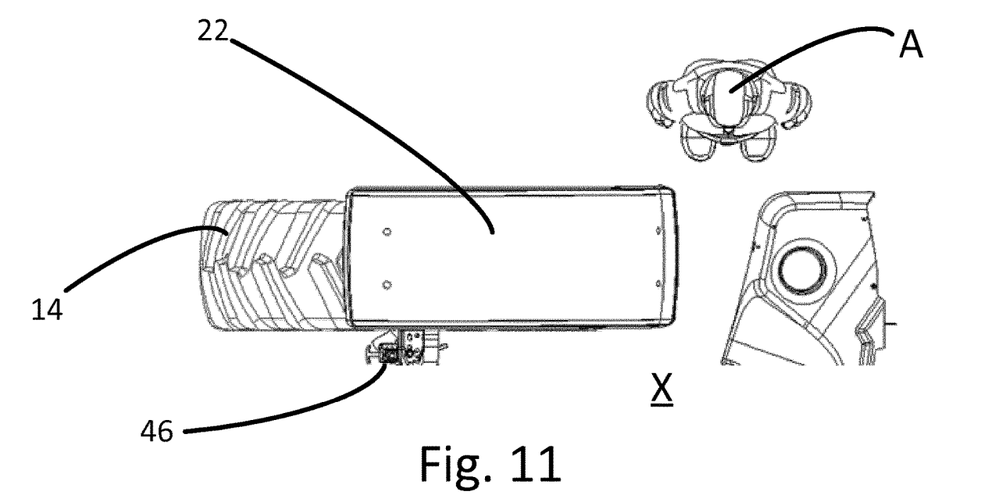
FIG. 11 is a top plan view of the area around a front wheel of an agricultural tractor prior to a service operation.
Figure 12:
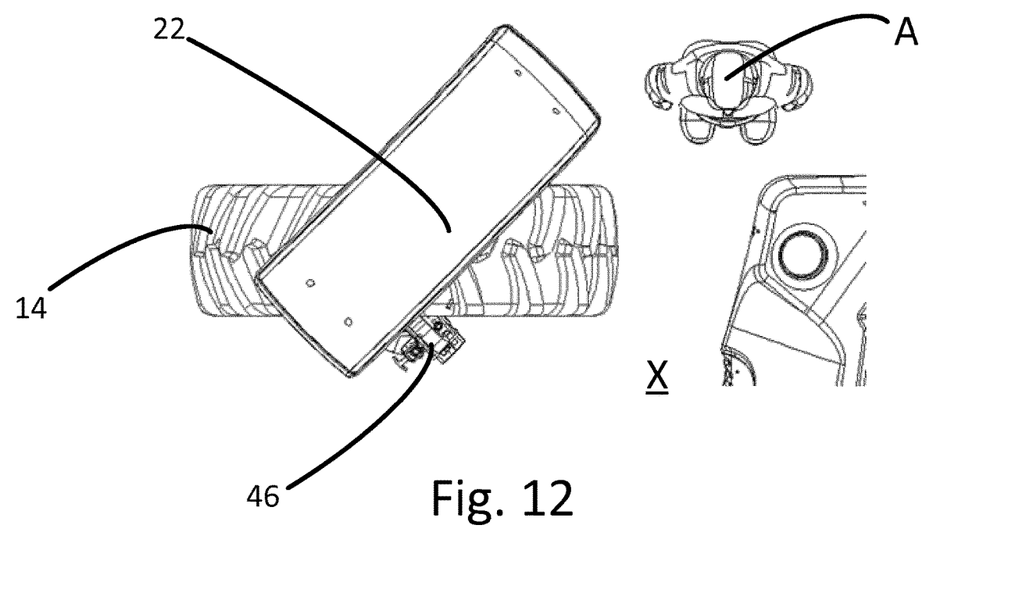
FIG. 12 is a top plan view of the area of FIG. 11 during a service operation, when the pivoting mudguard assembly is retained in a service configuration.

With reference to FIGS. 11 and 12, through use of the locking mechanism 42, an operator A is able to gain safe and secure access to inboard areas X of the tractor 10 when performing a service operation. When faced with the normal configuration of mudguard 22 adjacent the wheel 14, as shown in FIG. 11, the operator A can actuate the lever 82 of the locking mechanism 46 to move the locking pin 66 into the advanced position as described above. The mudguard 22 can then be moved into the service position, as shown in FIG. 12, such that the locking pin 66 engages with the locking plate 44 to hold the mudguard 22 in position. With the engagement of the pin 66 with the plate 44, the rotating part 38 is prevented from rotatably returning to the normal operating position, such that the mudguard 22 is held in the service position. As a result, the operator A can easily access the inboard area X of the tractor 10.

Figure 10:
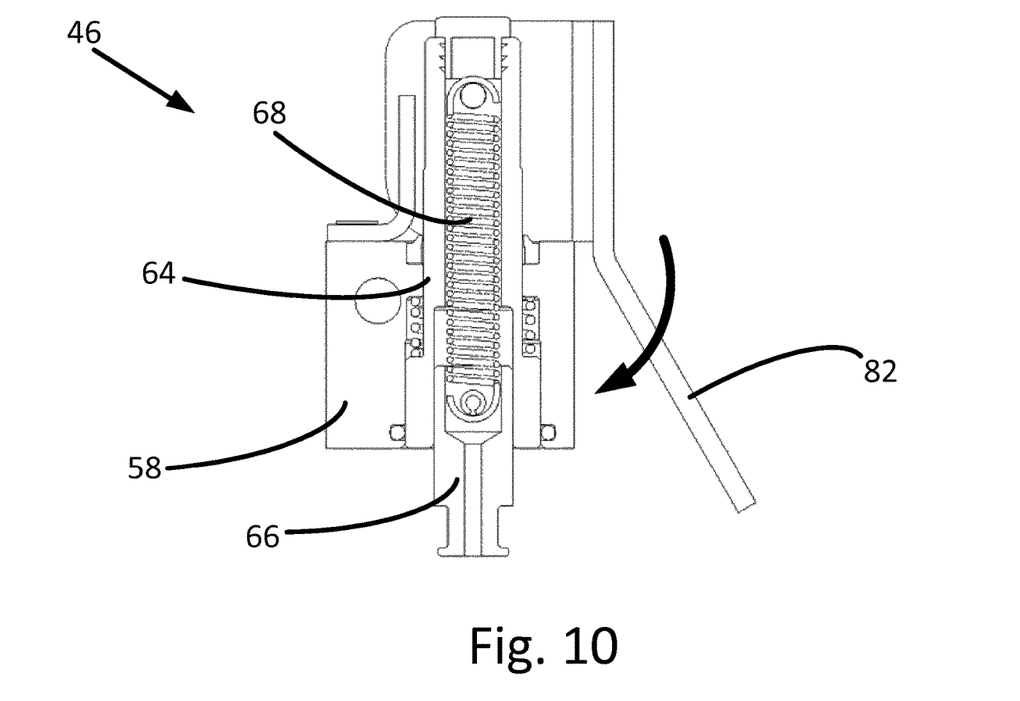
FIG. 10 is a cross-sectional view of the locking mechanism of FIG. 6 on return to the retracted position.

When it is desired to release the mudguard 22 from the service position, the lever 82 is returned to the normal operational position, as shown in FIG. 10. While the carriage member 64 is accordingly returned to the retracted position within the housing block 58, the locking pin 66 may be held in the advanced position by engagement of the lip 84 of the locking pin 66 with the locking plate 44. In such a case, the locking pin 66 may be released from engagement by the operator, by manual movement of the mudguard 22 and associated components to release the locking plate 44 from engagement with the pin 66. Once this is done, the locking pin 66 returns to the retracted position within the carriage member 64 through action of the spring 68.

Figure 13:
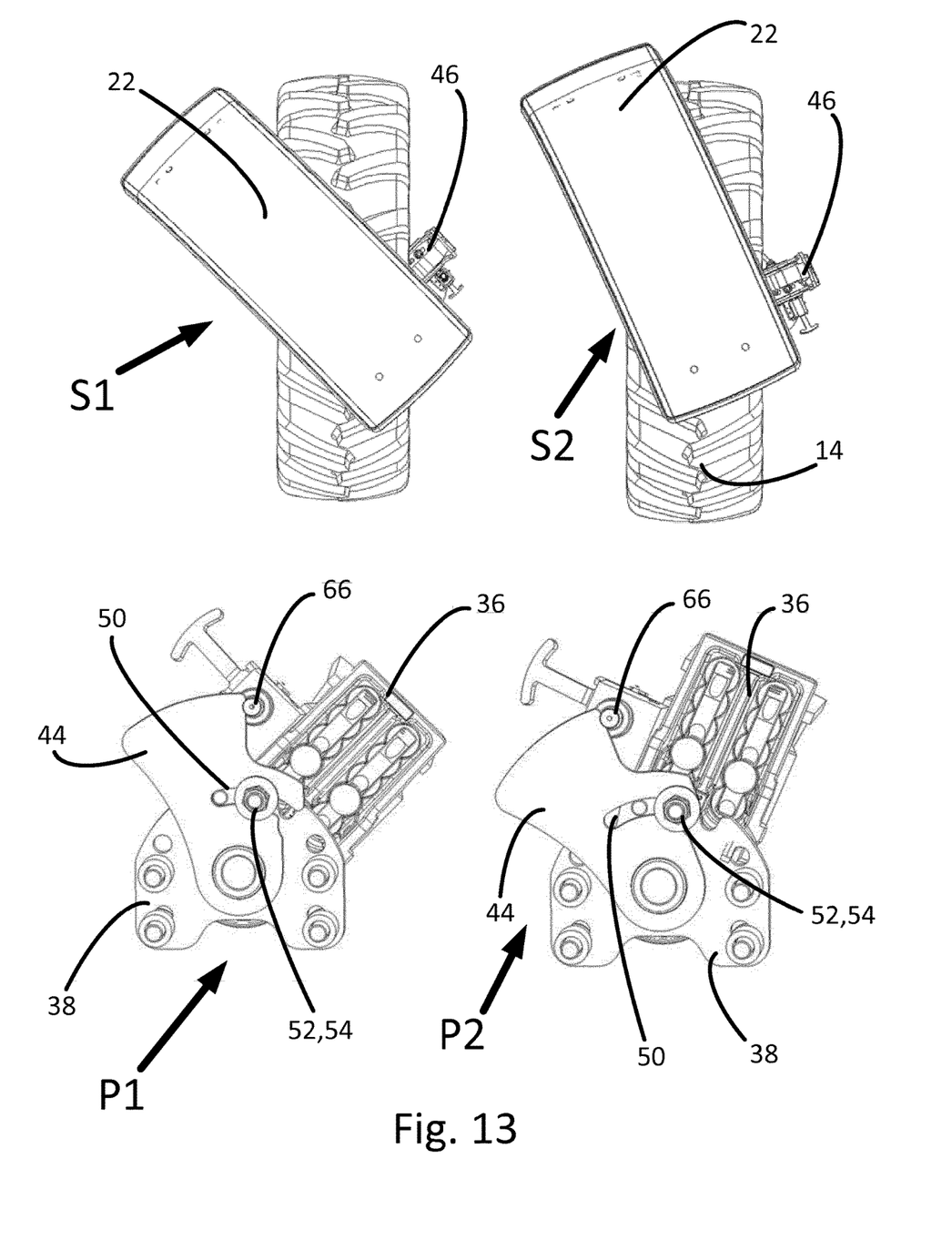
FIG. 13 is an overview illustrating how different service positions can be enabled by use of the locking mechanism according to the invention.

As described above in relation to FIG. 5, the service angle provided by the locking mechanism 42 can be adjusted by variation of the position of the locking plate 44 relative to the fixed part 36 of the assembly 30. With reference to the examples shown in FIG. 13, the securing of the locking plate 44 at indicated position P1 results in a possible service position as indicated at S1. Similarly, the securing of the locking plate 44 at indicated position P2 results in a possible service position as indicated at S1. Preferably, the service angle can be adjusted across a wide range of possible angles, preferably from 10-45 degrees, further preferably from 25-45 degrees.

It will be understood that the locking mechanism 42 may be provided as a kit of parts for installation or retrofitting onto an existing rotating mudguard assembly system. It will be understood that due to the simplicity of the design, accordingly the same parts of locking mechanism 42 can be used for both left- and right-sided wheels.

The use of a pivoting or rotating mudguard assembly having a locking mechanism according to the invention provides for a safe and secure mechanism to retain a rotating mudguard in a service position during a service operation by an operator. The service position may be actuated without the need for any additional tools, and in addition the service position angle may be easily adjusted to accommodate different dimensions of wheel and/or vehicle.

The invention is not limited to the embodiments described herein, and may be modified or adapted without departing from the scope of the present invention.

The invention claimed is:

1. A rotating mudguard assembly of an agricultural vehicle, the assembly comprising:
   a fixed part for mounting to the agricultural vehicle;
   a rotating part for attaching a mudguard, the rotating part moveably mounted on the fixed part to allow the mudguard to be pivoted relative to the agricultural vehicle; and
   a locking mechanism comprising:
      a locking plate attached to one of the fixed or the rotating part; and
      a locking pin system attached to the fixed or the rotating parts without the locking plate attached, the locking pin system comprising:
         a moveable locking pin configured to selectively engage with the locking plate,
         wherein movement of the rotating part relative to the fixed part is limited by engagement of the locking pin with the locking plate,
         wherein the locking pin is moveable between an extended position and a retracted position and configured to engage with the locking plate when in the extended position, and
         wherein the locking pin is biased to the retracted position.

2. The rotating mudguard assembly of claim 1, wherein the locking pin system further comprises a spring configured to bias the locking pin towards the retracted position.

3. The rotating mudguard assembly of claim 1, wherein the locking mechanism is configured to selectively retain the rotating part of the mudguard assembly in a service position, where the rotating part is held at a service angle relative to the fixed part.

4. The rotating mudguard assembly of claim 3, wherein the locking plate is adjustably attached to one of the fixed or the rotating parts to allow for adjustment of the service angle of the rotating part relative to the fixed part.

5. An agricultural vehicle comprising at least one rotating mudguard assembly as claimed in claim 1.

6. The agricultural vehicle of claim 5, wherein the agricultural vehicle comprises a tractor.

7. A rotating mudguard assembly for an agricultural vehicle, the assembly comprising:
   a fixed part for mounting to the agricultural vehicle;
   a rotating part for attaching a mudguard, the rotating part moveably mounted on the fixed part to allow the mudguard to be pivoted relative to the agricultural vehicle; and
   a locking mechanism comprising:
      a locking plate attached to one of the fixed or the rotating part; and
      a locking pin system attached to the fixed or the rotating parts without the locking plate attached, the locking pin system comprising:
         a moveable locking pin configured to selectively engage with the locking plate,
         wherein movement of the rotating part relative to the fixed part is limited by engagement of the locking pin with the locking plate,
         wherein the locking pin is moveable between an extended position and a retracted position and configured to engage with the locking plate when in the extended position;
         a lever to control movement of the locking pin between the extended and the retracted positions;
         a housing block having a through-going aperture; and
         a carriage member received in the aperture, wherein the lever is pivotally coupled with a first end of the carriage member and the locking pin is located at an opposed second end of the carriage member.

8. The rotating mudguard assembly of claim 7, wherein the locking pin system further comprises an auxiliary spring located in the housing block to bias the carriage member towards the second end, away from the lever.

9. A rotating mudguard assembly for an agricultural vehicle, the assembly comprising:
   a fixed part for mounting to the agricultural vehicle;
   a rotating part for attaching a mudguard, the rotating part moveably mounted on the fixed part to allow the mudguard to be pivoted relative to the agricultural vehicle; and
   a locking mechanism comprising:
      a locking plate attached to one of the fixed or the rotating part; and
      a locking pin system attached to the fixed or the rotating parts without the locking plate attached, the locking pin system comprising:
         a moveable locking pin configured to selectively engage with the locking plate,
         wherein movement of the rotating part relative to the fixed part is limited by engagement of the locking pin with the locking plate, and
         wherein the locking pin comprises a lip at a free end of the locking pin, the lip configured to engage with an opposed face of the locking plate facing away from the locking pin.

10. A locking mechanism for installation on a rotating mudguard assembly, the locking mechanism comprising:
    a locking plate for attachment to one of a fixed or a rotating part of the rotating mudguard assembly; and
    a locking pin system for attachment to the fixed or the rotating part to which the locking plate is not attached, the locking pin system comprising:
       a moveable locking pin configured to selectively engage with the locking plate,
       wherein movement of the rotating part relative to the fixed part is limited by engagement of the locking pin with the locking plate,
       wherein the locking pin is moveable between an extended position and a retracted position and configured to engage with the locking plate when in the extended position, and
       wherein the locking pin is biased to the retracted position.

* * * * *